United States Patent Office 3,420,677
Patented Jan. 7, 1969

3,420,677
TASTE OF FOOD AND DRINKS
Akio Shiga, Machida-shi, Japan, assignor to Kyowa Hakko Kogyo Co., Ltd., Tokyo, Japan, a corporation of Japan
No Drawing. Filed July 19, 1966, Ser. No. 566,208
Claims priority, application Japan, July 23, 1965, 40/44,169
U.S. Cl. 99—140        9 Claims
Int. Cl. A23l 1/22

This invention relates to an improvement in the taste of food-stuffs and condiments. More particularly, it relates to the discovery of a surprising combination of substances which enhances the taste of food and drinks and condiments. Even more particularly, the invention relates to improving the taste of food, drinks and condiments which contain 5'-nucleotides.

Accordingly, the principal object of the present invention is to improve the taste of edible substances in an efficacious and simple manner.

The present invention is characterized by the fact that L-asparagine or a substance containing L-asparagine when combined with 5'-nucleotides imparts a delicious taste to foods or condiments containing the same.

L-asparagine as such does not have or impart a delicious taste. However, as a result of much research, the present inventor has found that L-asparagine shows a strong synergistic action in the presence of 5'-nucleotides, thereby resulting in a very favorable and delicious taste. This favorable taste is strong even if sodium L-glutamate is entirely absent therefrom.

L-asparagine is one of the non-essential amino acids, It is widely distributed in natural materials and is found in particular abundance in the roots of beets (*Beta vulgaris*). However, as stated above, L-asparagine as an individual substance does not have a delicious taste. However, the same L-asparagine when used together with 5'-nucleotides such as sodium 5'-inosinate displays a remarkably delicious taste which is more favorable than that of sodium 5'-inosinate alone. This result is indicated in Table 1 below.

In accordance with the data shown in Table 1, ten different tasters tested the various compositions of samples indicated therein. An examiner tabulated and correlated a marking system in conformity with the following standards.

Mark of "0"—No variation observed.
Mark of "1"—Slight variation observed.
Mark of "2"—Conspicuous variation observed.
Mark of "3"—Considerably large variation observed.
Mark of "4"—Extremely conspicuous variation observed.

Thus, the indication of delicious taste of the various samples provided is indicated in Table 1 by the total of the marks obtained, thereby giving a ranking and an indication of the delicious tastes thereof.

The percentages noted in Table 1 are by weight.

It can be seen from Table 1 that sodium 5'-inosinate alone does not have or impart a delicious taste. This is true also for L-asparagine alone. However, the two of these substances in combination show a strong delicious taste which was observed by the tasters as being very favorable.

Although it is known that sodium L-glutamate and 5'-nucleotides create a delicious taste by a synergistic action, it has not been known that an increased delicious taste is created by the synergistic action of L-asparagine and 5'-nucleotides which is of a good nature and is not inferior to the delicious taste obtained by the synergistic action of sodium L-glutamate and 5'-nucleotides.

With condiments which already contain L-asparagine, an amount of 5'-nucleotides, for example, sodium 5'-inosinate, may be added thereto in accordance with the intended objective. Generally, it is appropriate to add a substance such as sodium 5'-inosinate in the range of 1:100 to 100:100, by weight, with respect to the amount of 5'-nucleotide to L-asparagine.

Condiments prepared in this way were used in a concentration of from 0.01 to 1.0% by weight in various foodstuff processings and culinary processes, and a very satisfactory effect was observed as a result thereof.

The following examples are given merely as illustrative of practical manufacturing embodiments of the present invention and are not to be considered as limiting.

TABLE 2

[100 gram portions of various compositions of condiments, as indicated below, are prepared]

| Example | L-asparagine (grams) | 5'-nucleotide |
|---|---|---|
| I | 90 | 10 grams of sodium 5'-inosinate. |
| II | 50 | 50 grams of sodium 5'-guanylate. |
| III | 10 | (a) 85 grams of sodium L-glutaminate. (b) 5 grams of sodium 5'-guanylate. |
| IV | 19.5 | (a) 80 grams of edible salt (NaCl). (b) 0.5 gram of sodium 5'-adenosine triphosphate. |
| V | 15 | (a) 50 grams of edible salt (NaCl). (b) 30 grams of sodium L-glutaminate. (c) 5 grams of sodium 5'-adenylate. |

The condiments prepared in accordance with the examples shown in Table 2 display a remarkably improved taste, compared with conventional condiments containing sodium glutaminate as the main ingredient. Moreover, a conspicuously favorable effect was observed when these condiments were added to foodstuffs.

In general, the preferred amount of L-asparagine with respect to the amount of 5'-nucleotide to be employed in accordance with the present invention ranges from 100:1 to 100:100 by weight.

The invention being thus described, it will be obvious that the same may be varied in many ways. Such variations are not to be regarded as a departure from the spirit and scope of the invention, and all such modifications are intended to be included within the scope of the following claims.

TABLE 1

| Sample No. | Composition of samples | A | B | C | D | E | F | G | H | I | J | Total of Marks |
|---|---|---|---|---|---|---|---|---|---|---|---|---|
| 1 | Water | 0 | 0 | 0 | 0 | 0 | 0 | 0 | 0 | 0 | 0 | 0 |
| | Sodium 5'-inosinate, 0.05% | 1 | 0 | 0 | 0 | 0 | 0 | 0 | 0 | 0 | 0 | 1 |
| 2 | Water | 0 | 0 | 0 | 0 | 0 | 0 | 0 | 0 | 0 | 0 | 0 |
| | Sodium 5'-inosinate, 0.1% | 0 | 0 | 0 | 1 | 1 | 0 | 0 | 1 | 0 | 0 | 3 |
| 3 | Water | 0 | 0 | 0 | 0 | 0 | 0 | 0 | 0 | 0 | 0 | 0 |
| | Sodium 5'-inosinate, 0.2% | 0 | 0 | 2 | 0 | 0 | 0 | 0 | 0 | 0 | 0 | 2 |
| 4 | Water | 0 | 0 | 0 | 0 | 0 | 0 | 0 | 0 | 0 | 0 | 0 |
| | L-asparagine, 0.1% | 0 | 0 | 0 | 0 | 0 | 0 | 0 | 1 | 0 | 0 | 1 |
| 5 | Water | 0 | 0 | 0 | 0 | 0 | 0 | 0 | 0 | 0 | 0 | 0 |
| | L-asparagine, 0.2% | 0 | 0 | 0 | 0 | 0 | 0 | 1 | 1 | 0 | 0 | 2 |
| 6 | Water | 0 | 0 | 0 | 0 | 0 | 0 | 0 | 0 | 0 | 0 | 0 |
| | L-asparagine, 0.1%+sodium 5'-inosinate, 0.05% | 3 | 3 | 3 | 3 | 4 | 4 | 3 | 3 | 3 | 4 | 33 |
| 7 | Water | 0 | 0 | 0 | 0 | 0 | 0 | 0 | 0 | 0 | 0 | 0 |
| | L-asparagine, 0.5%+sodium 5'-inosinate, 0.05% | 4 | 4 | 4 | 4 | 4 | 4 | 4 | 4 | 4 | 4 | 40 |

What is claimed is:

1. A composition useful for enhancing the taste of food and drinks comprising L-asparagine and a 5'-nucleotide.

2. The composition of claim 1, wherein the proportion of L-asparagine to 5'-nucleotide ranges from 100:1 to 100:100 by weight.

3. The composition of claim 1, wherein said 5'-nucleotide is selected from the group consisting of sodium 5'-inosinate, sodium 5'-guanylate, sodium 5'-adenylate and sodium 5'-adenosine triphosphate.

4. A foodstuff containing from 0.01 to 1.0% by weight of a composition comprising L-asparagine and a 5'-nucleotide.

5. The foodstuff of claim 4, wherein said 5'-nucleotide is selected from the group consisting of sodium 5'-inosinate, sodium 5'-guanylate, sodium 5'-adenylate and sodium 5'-adenosine triphosphate.

6. A process for improving and enhancing the taste of foodstuffs and condiments which comprises incorporating therein a composition comprising L-asparagine and a 5'-nucleotide.

7. The process of claim 6, wherein the proportion of L-asparagine to 5'-nucleotide ranges from 100:1 to 100:100 by weight.

8. The process of claim 7, wherein from 0.01 to 1.0% by weight of said composition is employed.

9. The process of claim 8, wherein said 5'-nucleotide is selected from the group consisting of sodium 5'-inocinate, sodium 5'-guanylate, sodium 5'-adenylate and sodium 5'-adenosine triphosphate.

References Cited

UNITED STATES PATENTS 3,104,171   9/1963   Sakaguchi et al. _____ 99—140

ALVIN E. TANENHOLTZ, *Primary Examiner.*

U.S. Cl. X.R.

99—143